United States Patent
Saavedra et al.

(10) Patent No.: US 10,095,254 B2
(45) Date of Patent: Oct. 9, 2018

(54) POWER DISTRIBUTION MANAGEMENT

(71) Applicant: Cisco Technology, Inc., San Jose, CA (US)

(72) Inventors: Luis R. Saavedra, Cupertino, CA (US); Amrik Singh Bains, Livermore, CA (US); Samir Bouadjel, Los Gatos, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 354 days.

(21) Appl. No.: 14/668,963

(22) Filed: Mar. 25, 2015

(65) Prior Publication Data
US 2016/0282892 A1    Sep. 29, 2016

(51) Int. Cl.
*G05F 1/66* (2006.01)
*G05B 15/02* (2006.01)
(Continued)

(52) U.S. Cl.
CPC .............. *G05F 1/66* (2013.01); *G05B 15/02* (2013.01); *G06F 1/263* (2013.01); *G06F 1/30* (2013.01);
(Continued)

(58) Field of Classification Search
CPC .... G05F 1/66; G06F 1/263; G06F 1/30; H02J 3/48; H02J 1/10; H02J 3/38; G05B 15/02
(Continued)

(56) References Cited

U.S. PATENT DOCUMENTS 6,215,202 B1 *  4/2001  Luongo ............... H02J 15/00
                                                    307/23
8,588,991 B1 * 11/2013  Forbes, Jr. ........... G05B 19/02
                                                    700/286
(Continued)

FOREIGN PATENT DOCUMENTS

CN    102749982    10/2012
WO    2014122930    8/2014

OTHER PUBLICATIONS

Santacana et al., "Getting Smart", IEEE, Mar./Apr. 2010, pp. 41-48.*

(Continued)

*Primary Examiner* — Chun Cao
(74) *Attorney, Agent, or Firm* — Fernando & Partners LLP (57) ABSTRACT

Various implementations disclosed herein include a power distribution system that provides flexible and/or multi-source supply capacity in response to changes in load power demand relative to active power supply capacity, and based at least in part on a performance objective function. In some implementations, a power distribution system includes a plurality of power supplies, and a power control module connected to control the plurality of power supplies. The power supplies are configured to deliver a current to a power supply node, and are also configured to responsively adjust the current in response to a control command. The power control module provides control commands that are produced in response to threshold changes in load power demand relative to active power supply capacity provided by one or more of the plurality of power supplies, and based at least in part on a performance objective function, such as efficiency, redundancy, and demand tracking.

18 Claims, 8 Drawing Sheets

(51) Int. Cl.
*G06F 1/26* (2006.01)
*G06F 1/30* (2006.01)
*H02J 1/10* (2006.01)
*H02J 3/38* (2006.01)
*H02J 3/48* (2006.01)

(52) U.S. Cl.
CPC ............... *H02J 1/10* (2013.01); *H02J 3/38* (2013.01); *H02J 3/48* (2013.01)

(58) Field of Classification Search
USPC ................................................ 700/297, 286
See application file for complete search history.

(56) References Cited

U.S. PATENT DOCUMENTS

| | | | |
|---|---|---|---|
| 2001/0043050 A1* | 11/2001 | Fisher, Jr. | H02J 7/0068 320/101 |
| 2006/0208571 A1* | 9/2006 | Fairlie | F17D 1/04 307/11 |
| 2009/0119064 A1 | 5/2009 | Brundridge | |
| 2009/0326729 A1* | 12/2009 | Hakim | G06Q 50/06 700/295 |
| 2010/0077238 A1 | 3/2010 | Vogman | |
| 2010/0264741 A1 | 10/2010 | Togare | |
| 2010/0318234 A1* | 12/2010 | Moore | H02J 7/0013 700/293 |
| 2011/0106321 A1* | 5/2011 | Cherian | H02J 3/00 700/286 |
| 2011/0204720 A1* | 8/2011 | Ruiz | B60L 11/1816 307/66 |
| 2013/0184891 A1 | 7/2013 | Etaati | |
| 2013/0226360 A1* | 8/2013 | Wilkins | G06F 1/26 700/295 |
| 2015/0066231 A1* | 3/2015 | Clifton | H02J 7/0068 700/296 |
| 2016/0218505 A1* | 7/2016 | Krupadanam | G06Q 10/06 |

OTHER PUBLICATIONS

International Search Report and Written Opinion for corresponding PCT/US2016/022810 dated Aug. 24, 2016, 12 pages.
International Preliminary Report on Patentability for PCT/US2016/022810 dated Oct. 5, 2017, 10 pages.

* cited by examiner

FIG. 8

US 10,095,254 B2

POWER DISTRIBUTION MANAGEMENT

TECHNICAL FIELD

The present disclosure generally relates to power supplies, and in particular, to improving the reliability and efficiency of distributing electrical power to multiple loads.

BACKGROUND

The ongoing development of data networks often involves incorporating additional, demand-responsive functionality and/or capacity into networking equipment in order to enable greater connectivity and flexibility. These ends are pursued in part by increasing the number of functional modules included in a network node and/or the capacity of a particular node function (e.g., switching, routing, etc.) by increasing the number of components that contribute to the functional capacity. However, as the number of modules and/or components increases, power supply management issues become more complex in view of competing demands for efficiency, redundancy and sufficiently high power.

For example, it is typically desirable to ensure a reliable power supply to heavily utilized information technology (IT) infrastructure nodes, while also managing efficiency and link stability. Known power distribution systems for networking equipment employ two power supplies that are arranged and operated to supply more power than is utilized at a given instant. The two power supplies are coupled such that each power supply provides some power to a combination of loads (e.g., the modules and/or components of a network node). If one power supply fails, the second power supply remains available to deliver power to the combination of loads. This power distribution system ensures that both power supplies are normally always active in order to provide redundancy and limit packet loss and/or link failures that may result from hard switching between power supplies. However, this power distribution system a number of problems. For example, it susceptible to brown-outs that are caused by rapid increases in demand because the power supplies are not responsive enough to closely track rapid demand changes. In turn, packets or even links can be lost. Conversely, when demand drops suddenly, the overall efficiency suffers because the power supplies are again not responsive enough to closely track demand changes.

BRIEF DESCRIPTION OF THE DRAWINGS

So that this disclosure can be understood by those of ordinary skill in the art, a detailed description may be had by reference to aspects of some illustrative implementations, some of which are shown in the accompanying drawings. The appended drawings, however, illustrate only some example features of the present disclosure and are therefore not to be considered limiting, for the description may admit to other effective features.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described herein in order to provide a thorough understanding of illustrative implementations shown in the drawings. However, the drawings merely show some example aspects of the present disclosure and are therefore not to be considered limiting. Those of ordinary skill in the art will appreciate from the present disclosure that other effective aspects and/or variants do not include all of the specific details described herein. Moreover, well-known systems, methods, components, devices and circuits have not been described in exhaustive detail so as not to unnecessarily obscure more pertinent aspects of the implementations described herein.

Overview

Previously available power distribution systems provided for networking equipment incorporating demand-responsive functionality and/or capacity do not adequately satisfy the competing demands for efficiency, redundancy and high power. By contrast, various implementations disclosed herein include a power distribution system that provides flexible and/or multi-source power supply capacity in response to changes in load power demand relative to active power supply capacity, and based at least in part on a performance objective function. More specifically, in accordance with some implementations, a power distribution system includes a plurality of power supplies each having a respective output power supply line and a respective control input, and a power control module connected to the control inputs of the plurality of power supplies. In various implementations, each of the output power supply lines are connectable to deliver current to a power supply node, and each of the plurality of power supplies is configured to responsively adjust a corresponding output current on the respective output power supply line in response to a control command received by the respective control input. In various implementations, the power control module is configured to adjust the operation of the plurality of power supplies by providing control commands that are produced in response to changes in load power demand relative to active power supply capacity provided by one or more of the plurality of power supplies and based at least in part on a performance objective function.

Figure 1:
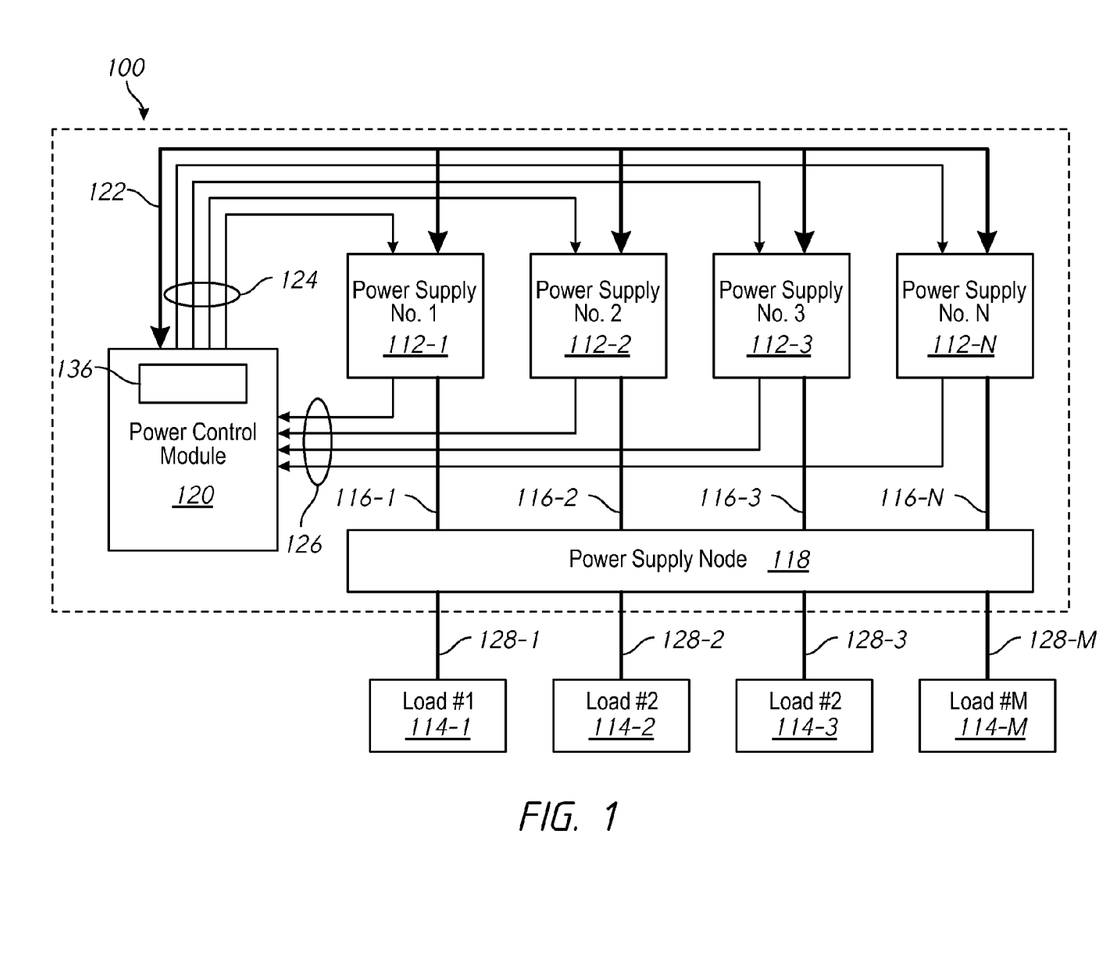
FIG. 1 is a block diagram of a power distribution system in accordance with some implementations.

FIG. 1 is a block diagram of a power distribution system 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. As a non-limiting example, in some implementations, the power distribution system 100 includes a power control module 120, a common power supply node 118, an a number of power supplies 112-1, 112-2, 112-3, . . . , 112-N. The power supplies 112-1, 112-2, 112-3, . . . , 112-N are coupled in a current sharing configuration in which each power supply is coupled to deliver current to the common power supply node 118 through respective output supply lines 116-1, 116-2, 116-3, . . . , 116-N. In some implementations, the power distribution system 100 is arranged to deliver power to a number of loads 114-1, 114-2, 114-3, . . . , 114-M, which are coupled to the common power supply node 118 through respective distribution lines 128-1, 128-2, 128-3, . . . , 128-M.

The power distribution system 100 enables the deployment of multiple power supplies 112-1, 112-2, 112-3, . . . , 112-N to power one or more electrical loads 114-1, 114-2, 114-3, . . . , 114-M. In various implementations, the number of loads varies from one implementation to the next, and/or varies over time for a particular implementation. For example, enterprise grade routers and switches often have a chassis that support the installation of a variable number of line cards. In order to accommodate a varying number of line cards the number of power supplies utilized will depend on the maximum power consumption of each line card, the number of line cards installed, the capacity of each power supply, the preferred or tolerating operating efficiency of each power supply, and the amount of power supply redundancy desired. For example, to adequately achieve a 2:1 redundancy the total capacity of the power supplies is preferably at least twice as large as the peak power consumption of the installed line cards. In various implementations, the total number of power supplies 112-1, 112-2, 112-3, . . . , 112-N is more or less than the total number of anticipated loads 114-1, 114-2, 114-3, . . . , 114-M (i.e., N>M, or N<M, or N=M). In some implementations, the loads 114-1, 114-2, 114-3, . . . , 114-M include a number of networking function modules that each provide a particular node function capacity.

Each power supply 112-1, 112-2, 112-3, . . . , 112-N has a corresponding output supply line 116-1, 116-2, 116-3, . . . , 116-N that is ultimately connected to the common power supply node 118. In some implementations, the power supply node 118 serves as an aggregation point (or nexus) for the current supplied by each active power supply 112-1, 112-2, 112-3, . . . , 112-N during distribution to the electrical loads 114-1, 114-2, 114-3, . . . , 114-M, which draw current as needed, via power distributions lines 128-1, 128-2, 128-3, . . . , 128-M. As discussed in greater detail below, in operation, some of the power supplies 112-1, 112-2, 112-3, . . . , 112-N can be in a stand-by mode and thus not actively delivering current to the power supply node 118 at a particular instant.

A power control module 120 is provided to manage the operation of the power supplies 112-1, 112-2, 112-3, . . . , 112-N. In some implementations, the power control module 120 is coupled to the power supplies through a serial bus, a parallel bus, and/or dedicated control lines. For example, as shown in FIG. 1, the power control module 20 is coupled to each power supply 112-1, 112-2, 112-3, . . . , 112-N via a two wire serial control bus 122. The power control module 120 and power supplies 112-1, 112-2, 112-3, . . . , 112-N communicate with one another via a communications protocol that enables the components to communicate logical control signals or commands to one another. In some implementations, a single wire control line is used.

In operation, each power supply 112-1, 112-2, 112-3, . . . , 112-N can be switched between an active mode and a standby mode using an enable/disable signal 124. In the active mode, a power supply delivers current to the loads 114-1, 114-2, 114-3, . . . , 114-M through the common power supply node 118. In some implementations, the aggregation of the respective current draws from the loads 114-1, 114-2, 114-3, . . . , 114-M is indicative of the load power demand.

In the standby mode, a power supply does not supply a substantial amount power. In other words, in some implementations, each of the power supplies is switchable between an active mode, in which the power supply is enabled to supply a substantial output current, and a standby mode, in which the power supply is substantially prevented from supplying an output current power but is ready to do so in response to receiving an enable command on the respective control input. Nevertheless, even in standby mode, at least a portion of the power supply control electronics are active so as to be ready to switch to the active mode in response to a subsequently received enable signal.

The power control module 120 receives feedback on load power demand and, generally, controls the power supplies 112-1, 112-2, 112-3, . . . , 112-N based on changes in load power demand relative to active power supply capacity. For example, dynamically adding or removing electrical loads 114-1, 114-2, 114-3, . . . , 114-M to or from the power distribution system 100 will increase or decrease load power demand relative to the active power supply capacity. In some implementations, one or more of the loads 114-1, 114-2, 114-3, . . . , 114-M are switchable into or out of the system so as to vary the load power demand relative to the active power supply capacity. Similarly, a failure in any one of the active power supplies 112-1, 112-2, 112-3, . . . , 112-N will decrease the active power supply capacity relative to load power demand (equally stated: load power demand increases relative to active power supply). In some implementations, at least some of the power supplies are configured to transmit a power failure signal to the power control module 120 in response to sensing a failure condition, since the load power demand increases in relation to the active power supply capacity.

In some implementations, the power control module 120 determines the rated capacity of each of the power supplies 112-1, 112-2, 112-3, . . . , 112-N. For example, in some implementations, the rated capacity is determined by querying a power supply or receiving capacity information during a startup or initiation procedure when a power supply is initially installed. In some implementations, the power supplies 112-1, 112-2, 112-3, . . . , 112-N also convey load demand values by transmitting respective demand signals 126 to the power control module 120. In some implementations, the demand signal 126 represents the current draw and/or load factor (i.e., percentage of maximum load) currently supported by the power supply. The power control module 120 monitors overall load power demand by receiving the respective demand signals 126. With this information the power control module 120 determines if there is any change in overall load power demand relative to active power supply capacity. If there is substantial change (e.g., in breach of a threshold), the power control module 120, will activate or de-activate (place into standby mode) one or more of the power supplies 112-1, 112-2, 112-3, . . . , 112-N. In other words, the power control module 120 evaluates the magnitude of a change in order to determine whether or not a change to the number of power supplies operating in active mode is warranted. In some implementations, a threshold characterizes a range in which one or more of the plurality of networking function modules experiences or is close to experiencing an insufficient power condition.

In some implementations, the particular power supplies 112-1, 112-2, 112-3, . . . , 112-N that are activated or de-activated will depend on a performance objective function executed by the power control module 120. One example of a performance objective is energy efficiency. In some implementations, in response to substantial changes in load power demand relative to active power capacity, the power control module is configured to set the mode of each of the plurality of power supplies in order to at increase overall system energy efficiency. As the overall load power demand changes relative to the active power supply capacity, the load factor of at least one of the active power supplies will also change. Each power supply 112-1, 112-2, 112-3, . . . , 112-N has an efficiency curve, which typically depends on the load factor.

Figure 2A:
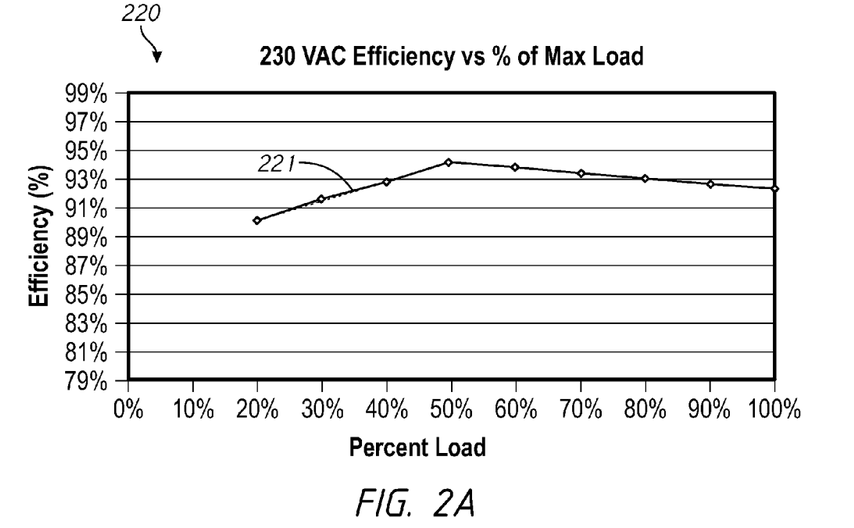
FIGS. 2A and 2B are performance graphs showing examples of power supply efficiency as a function of power supply load factor in accordance with some implementations.
Figure 2B:
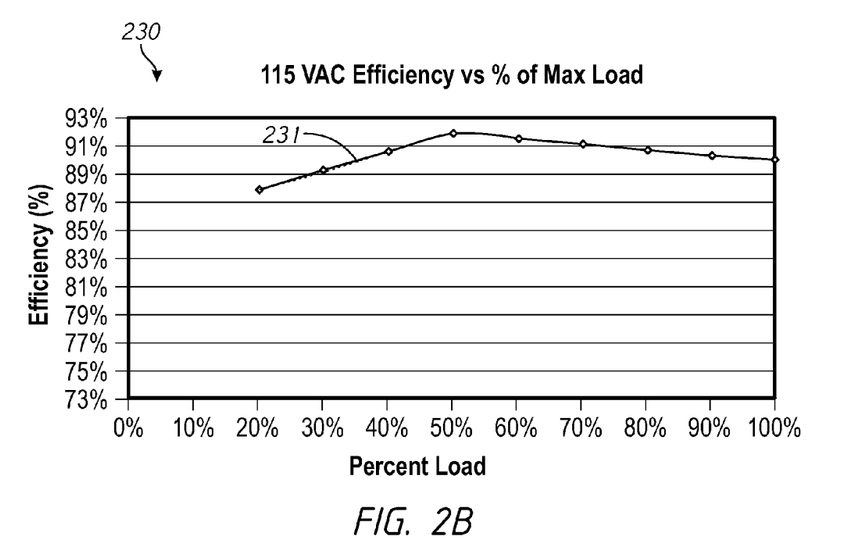

FIGS. 2A and 2B are performance graphs 220, 230 showing examples of power supply efficiency as a function of power supply load factor in accordance with some implementations. In some implementations, efficiency curve data can be programmed into the power control module 120 or dynamically provisioned by a particular power supply over the control bus 122, for example, as part of an initial connection or startup procedure. With this performance objective the power control module 120 attempts to maintain operation of each power supply 112-1, 112-2, 112-3, . . . , 112-N at or substantially close to the corresponding point of maximum efficiency of that power supply. For example, with reference to the efficiency curves 221, 231, shown in FIGS. 2A and 2B, the power control module 120 will attempt to control each active power supply 112-1, 112-2, 112-3, . . . , 112-N so that it operates at or substantially close to the 50% load factor, where efficiency peaks for each curve.

It can also be seen from the efficiency curves 221, 231 that if load power demand increases it will typically be more efficient to increase the load factor on the active power supplies 112-1, 112-2, 112-3, . . . , 112-N as opposed to activating a dormant power supply that is in standby mode. For example, in a situation where there are four power supplies of substantially equal capacity (e.g., 1 kW each), two of which are active and operating at 50% load factor, and two of which are in standby mode, if the load power requirements increase 20% (e.g., from 0.5 kW to 0.6 kW), it may be more efficient to operate the two active power supplies at 60% load factor as opposed to activating one of the standby power supplies and operating three power supplies at 40% load factor.

In some implementations, the power control module 120 is configured to establish a limit on the upper load factor at which a particular one of the power supplies 112-1, 112-2, 112-3, . . . , 112-N is permitted to operate. This can be implemented, for example, with a LIMIT command or control signal that is transmitted by the power control module 120 to a particular one of the power supplies 112-1, 112-2, 112-3, . . . , 112-N in order to limit the corresponding current output. This enables the power control module 120 to vary the load factors at which different power supplies operate, and thus to control the relative amount of current or power provided by each of the power supplies 112-1, 112-2, 112-3, . . . , 112-N. For example, in a situation where three power supplies of equal capacity are active it may be more efficient to operate two of the power supplies at 50% load factor and the remaining power supply at 80% load factor as opposed to operating all three of the power supplies at 60% load factor. In this case, the LIMIT command is used to limit two of the power supplies to operate at 50% load factor. This capability is also useful in situations where some or all of the power supplies have different efficiency curves, in which case the power control module 120 can select groupings of power supplies to operate at to improve overall efficiency.

Another example of a performance objective is redundancy. For example, if a desired redundancy factor is 1:1 and there are four substantially equally rated power supplies with a combined capacity that is double the maximum possible overall load, in some implementations, the power control module 120 can operate the power supplies so that all four power supplies are active but do not operate at more than 50% load factor. Additionally and/or alternatively, the power control module 120 can activate two power supplies that can operate at up to 100% load factor while leaving two power supplies in standby mode for redundancy purposes.

Another example of a performance objective is demand tracking. For example, if traffic demand at a particular networking node is known to experience frequent and wide fluctuations, in some implementations, the power control module 120 can operate the power supplies the power supplies are activated and deactivated based on load demand signals from functional load modules and/or traffic demand surges/dips that signal the need for more functional capacity provided by components that support the particular function. Additionally and/or alternatively, the power control module 120 can track and utilize heuristics that enable the power control module 120 to predictively track, and in some cases, lead power supply capacity in response to fluctuations in demand. In some implementations, the power control module 120 is configured to receive load demand values from one or more electrical loads. In some implementations, the power control module 120 is configured to detect a change in load power demand from a transient change in at least one of output voltage and output current in the plurality of power supplies. In some implementations, the power control module 120 is configured to receive load demand values from one or more of the plurality of power supplies.

In some implementations, the power control module 120 is configured to combine or prioritize performance objectives such as energy efficiency, redundancy, and tracking. For example, continuing with the previous example, under a combined performance objective the power control module 120 can initially place two power supplies in standby mode, operate the two remaining power supplies on the basis of efficiency, and activate or deactivate the power supplies based on fluctuations in demand in order to track demand while maintaining efficiency above a particular threshold. In some implementations, the power control module 120 includes switching logic 136 for activating and deactivating combinations of the plurality of power supplies in response substantial changes in load power demand and based at least in part on the performance objective function. In some implementations, the power control module 120 is connected to each of the pluralities of power supplies via a dedicated control line for at least one of setting a corresponding power supply mode and a corresponding operating point based at least in part on the performance objective function.

Figure 3:
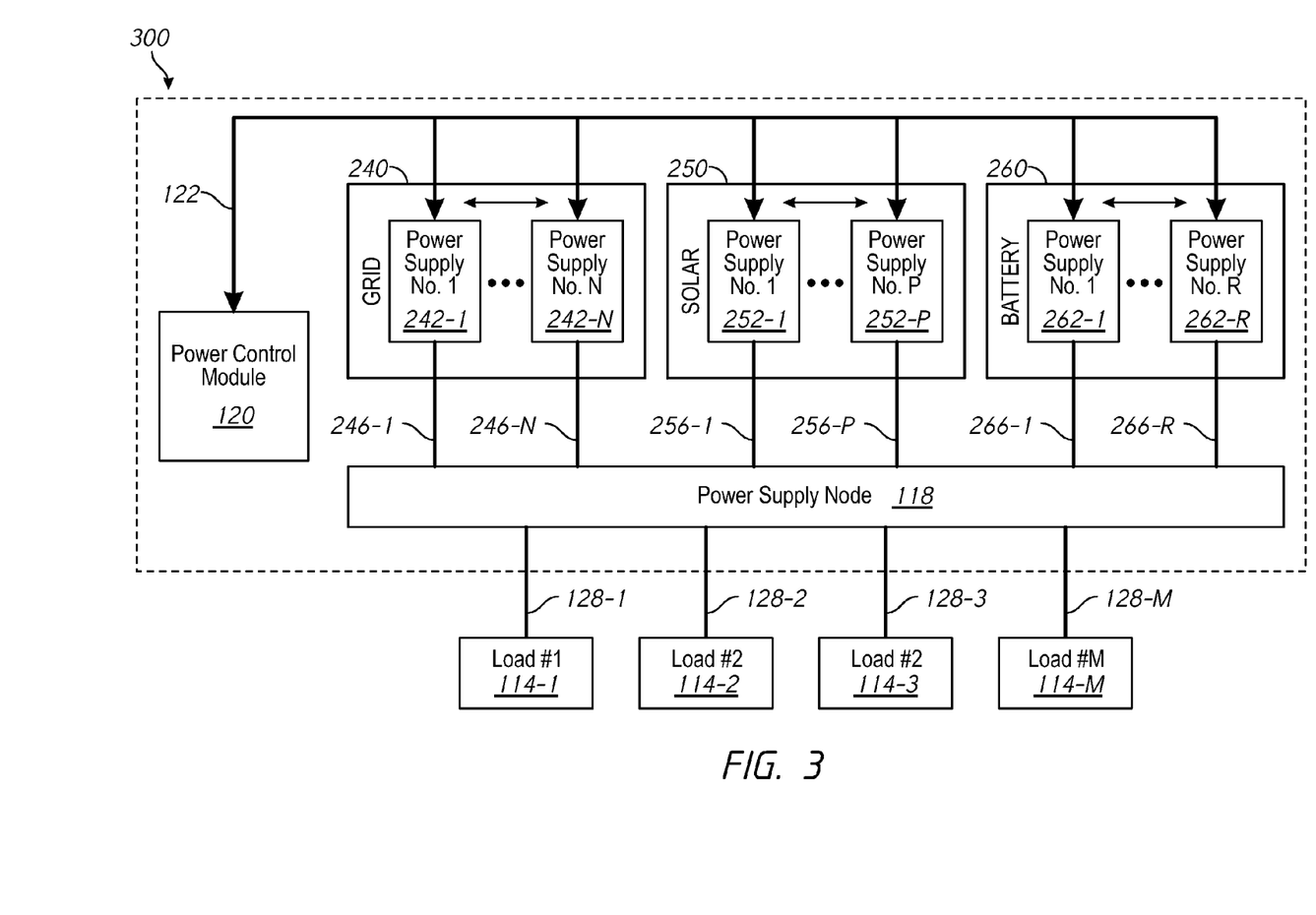
FIG. 3 is a block diagram of a power distribution system in accordance with some implementations.

Another example of a performance objective is supply-source preference. An example is described herein with reference to FIG. 3, which illustrates a power distribution system 300 in accordance with some implementations. The power distribution system 300 shown in FIG. 3 is similar to and adapted from the power distribution system 100 shown in FIG. 1. Elements common to FIGS. 1 and 3 include common reference numbers, and only the differences between FIGS. 1 and 3 are described herein for the sake of brevity. To that end, the power distribution system 300 includes power supply groups 240, 250, 260 that are configured to utilize different sources of input power.

As shown in FIG. 3, in some implementations, the first power supply group 240 is ultimately coupled to the electrical utility grid (i.e., grid power), the second power supply group 250 is configured to source and use solar power, and third power supply group 260 is configured to source and use a battery-based backup power source. The first power supply group 240 includes a number (N) of individual power supplies 242-1, . . . , 242-N, that are each coupled to the power supply node 118 via corresponding output supply lines 246-1, . . . , 246-N. The second power supply group 250 includes a number (P) of individual power supplies 252-1, . . . , 252-N, that are each coupled to the power supply node 118 via corresponding output supply lines 256-1, . . . , 256-P. The third power supply group 260 includes a number (R) of individual power supplies 262-1, . . . , 262-R, that are each coupled to the power supply node 118 via corresponding output supply lines 266-1, . . . , 266-R.

In some implementations, in operation, the power control module 120 executes an operating source-type objective preference which first exhausts the power supplied by the solar-based second power supply group 250 before utilizing the power supplied by the grid-connected first power supply group 240, with the battery-based third power supply group 260 being held in reserve in the event of a failure in one of the other two sources of power. The power control module 120 can also be programmed so that when one of the solar based power supplies fails or a corresponding load factor rises above a threshold, the system 300 switches preferences to use power from the grid.

Whatever the performance objective, the power control module 120 preferably incorporates and/or includes hardware-implemented switching logic that allows the power control module 120 to responsively activate or deactivate power supplies in order to avoid undesired transient power effects.

In a situation where load power demand rises quickly due, for example, to the instantaneous operating conditions and/or the activation of additional loads 114-1, 114-2, 114-3, . . . , 114-M, it may be desirable for the power control module 120 to activate one or more additional power supplies selected from one or more of the three power supply groups 240, 250, 260. However, if the change in demand is not sensed quickly enough and/or the additional power supply is not activated fast enough in response to the change in demand, then the loads 114-1, 114-2, 114-3, . . . , 114-M may be not be provided with enough power in this transient phase to operate adequately, resulting in a so called "brown out" condition. A similar situation can arise if one of the power supplies fails. The remaining active power supplies may exceed their rated capacity resulting in a brown-out condition and/or a loss of preferred efficiency. In networking equipment, for example, brown-out conditions could lead to link or data loss. In some implementations, sufficient sensing and response speeds of the system 300 are provided by integrating the power supply management functions into dedicated hardware logic and/or firmware, and reducing reliance of software control threads utilize a processor for interpretation and execution.

Likewise, in situations where load power demand drops quickly or fluctuates rapidly due to the dynamic removal of one or more loads and/or the instantaneous operating conditions of the loads 114-1, 114-2, 114-3, . . . , 114-M it may be desirable for the power control module 120 to de-activate one of the power supplies in order to maintain a preferred level of efficiency. A slow response time could result in situations where the system 300 is operating at sub-optimal efficiency for an undesirable period of time. This could have a noticeable effect on the overall power efficiency rating of a large scale installation such as a data center where energy efficiency is becoming an increasingly important criterion in order to reduce undesired byproducts such as heat and carbon emissions. Again, in some implementations, sufficient sensing and response speeds of the system 300 are provided by integrating the power supply management functions into dedicated hardware logic and/or firmware, and reducing reliance of software control threads utilize a processor for interpretation and execution.

As noted above, in some implementations, in order to avoid brown-out conditions and/or achieve increased operating efficiency, the power control module 120 includes hardware-implemented switching logic that is capable of activating a stand-by power supply within a period of time that is at least as long as the shortest holdover time of any of the power supplies in the system 300, and preferably substantially less than the shortest holdover time, for example, 50% thereof or less. In some implementations, at least one of the plurality of power supplies has a holdover time period where the at least one of the plurality of power supplies can adequately supply power to loads in the event of a cessation of input power to the power supply. In turn, the power control module 120 is configured to responsively activate another one of the plurality of power supplies or adjust the operation of one or more of the plurality of power supplies in a period of time at least equal to the shortest power supply holdover time.

Referring again to the power distribution system 100 of FIG. 1, the load power demand is communicated via the demand signals 126 as discussed above. If the load power demand rises quickly there will be a transient change in the output voltage or output current (depending on how the power supplies are configured) in at least one of the active power supplies 112-1, 112-2, 112-3, . . . , 112-N. If the load power demand decreases quickly there will be an opposing transient change in the output voltage or output current (depending on how the power supply is configured) in at least one of the active power supplies 112-1, 112-2, 112-3, . . . , 112-N. In some implementations, the power supplies 112-1, 112-2, 112-3, . . . , 112-N use the aforementioned transients to determine if there is a rapidly increasing or decreasing change in load power demand and signal the power control module 120 accordingly. In some implementations, a power supply failure can also be sensed through transient voltage or current changes in the active power supplies 112-1, 112-2, 112-3, . . . , 112-N as this will cause a rapid rise in load power demand relative to active power supply capacity. Additionally and/or alternatively, in some implementations a power supply includes one or more energy storage capacitors capable of supplying output power for a short period of time after input power ceases. Additionally and/or alternatively, in some implementations a power supply includes one or more sensors that are configured to detect a failure such as lack of sufficient input power from a source and transmit a corresponding failure signal to the power control module 120.

In some implementations, in order to provide sufficiently rapid responses to the change in load power demand or a power supply failure, the power control module 120 is implemented primarily in dedicated hardware, for example, through use of a field programmable gate array (FPGA) or programmable system on a chip (SoC). In some implementations, the hardware provides the communication interface order to reduce redundant and/or unnecessary communications and improve response times. Additionally and/or alternatively, in some implementations, the power control module 120 includes a dedicated microcontroller. Additionally and/or alternatively, in some implementations, such as the implementation discussed in greater detail below with reference to FIG. 6, the power control module 120 can be implemented partially in hardware for executing core switching, time-sensitive functionality and partially in software (e.g., an application executed by a general purpose central processing unit) for executing less time-sensitive functionality.

Figure 4:
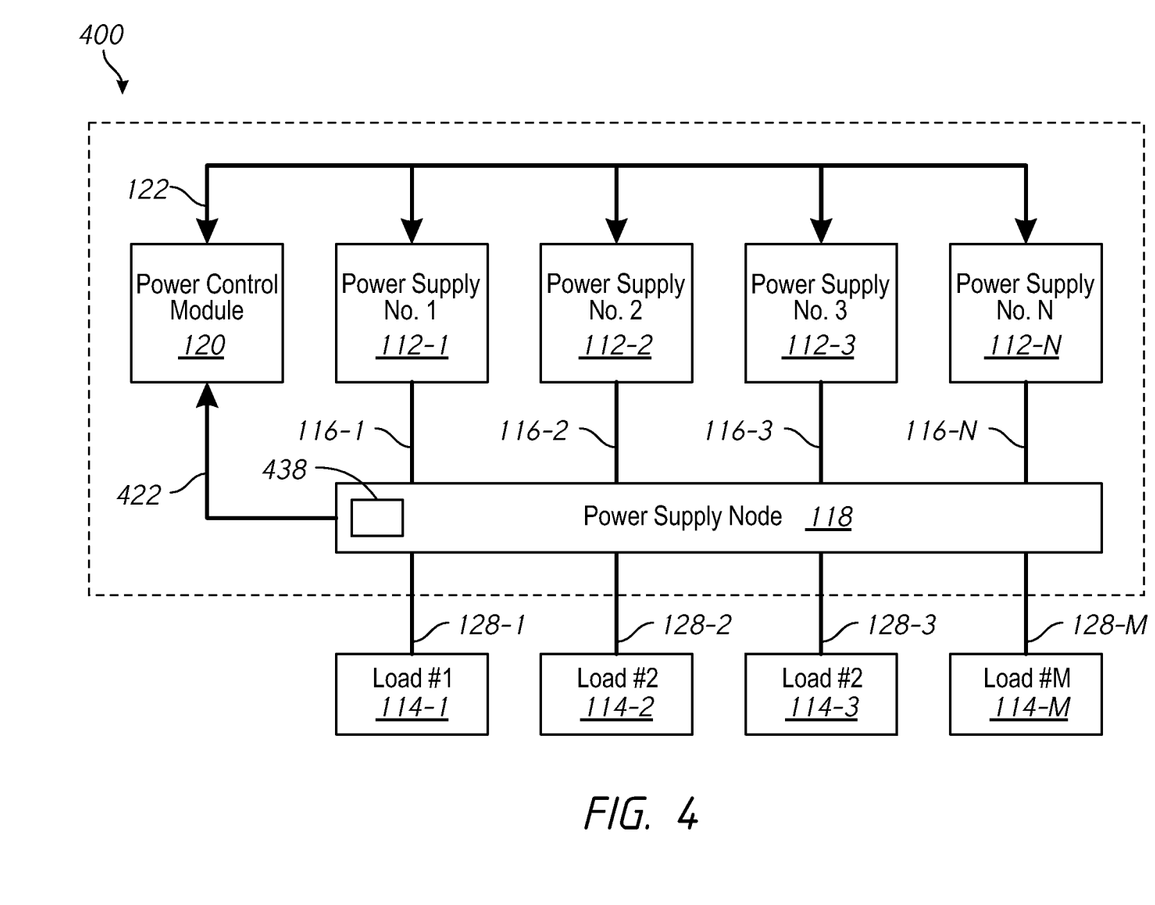
FIG. 4 is a block diagram of a power distribution system in accordance with some implementations.

In the examples described thus far changes in load power demand are signaled by individual power supplies. Additionally and/or alternatively, in some implementations, changes in load power demand are signaled by a sensor coupled to the power supply node 118. That is, in some implementations a sensor is coupled to the power supply node and is configured to detect at least one of the load power demand and a change in the load power demand. As an example, FIG. 4 is a block diagram of a power distribution system 400 so configured in accordance with some implementations. The power distribution system 400 shown in FIG. 4 is similar to and adapted from the power distribution system 100 shown in FIG. 1. Elements common to FIGS. 1 and 4 include common reference numbers, and only the differences between FIGS. 1 and 4 are described herein for the sake of brevity. To that end, the power distribution system 400 includes a sensor 438 coupled to the power supply node 118. In some implementations, the sensor 438 is operable to sense at least one of a change in current drawn by the loads 114-1, 114-2, 114-3, ..., 114-M (in aggregate or individually) and the current draw level at a given instant (in aggregate or individually). Moreover, the sensor 438 is also couple to communicate load power demand or changes therein over the control bus 422 to the power control module 120.

Figure 5:
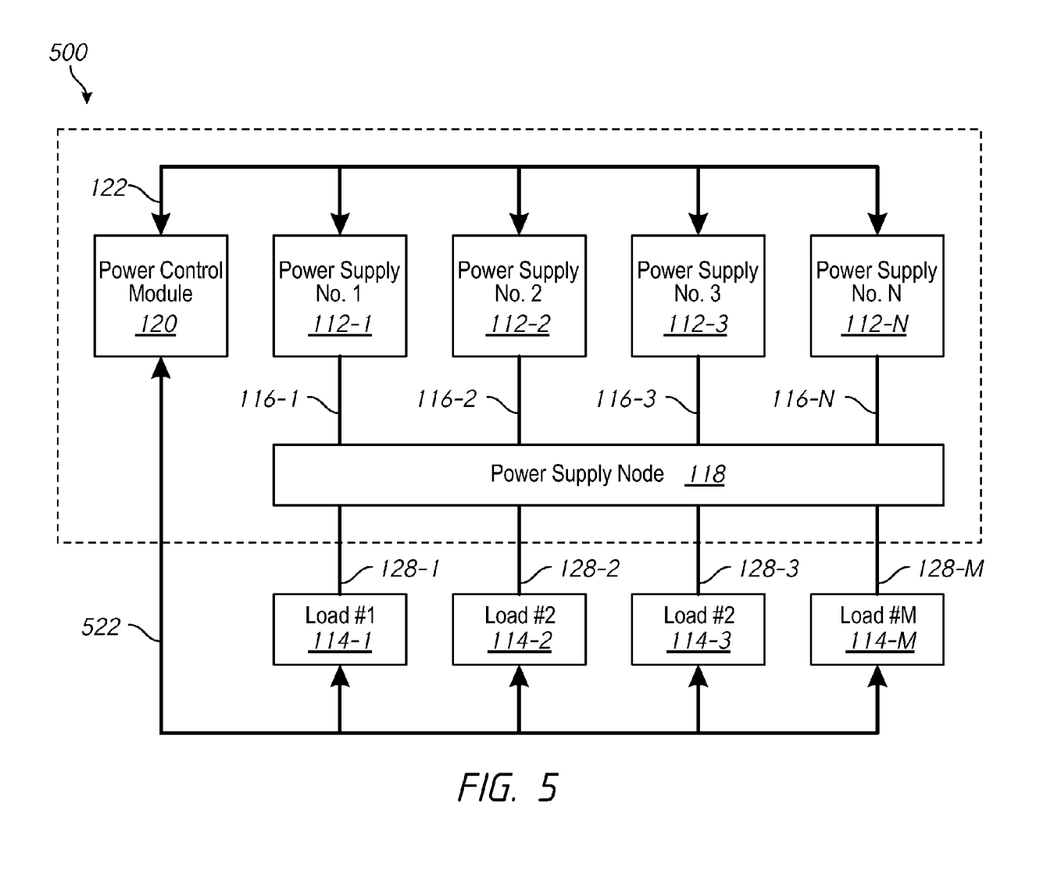
FIG. 5 is a block diagram of a power distribution system in accordance with some implementations.

Additionally and/or alternatively, in some implementations, the loads 114-1, 114-2, 114-3, ..., 114-M are configured to report at least one of a respective change in current drawn and a respective current draw level at a given instant. As an example, FIG. 5 is a block diagram of a power distribution system 500 so configured in accordance with some implementations. More specifically, the loads 114-1, 114-2, 114-3, ..., 114-M are configured to report at least one of a respective change in current drawn and a respective current draw level at a given instant over a control buss 522 to the power control module 120.

Figure 6:
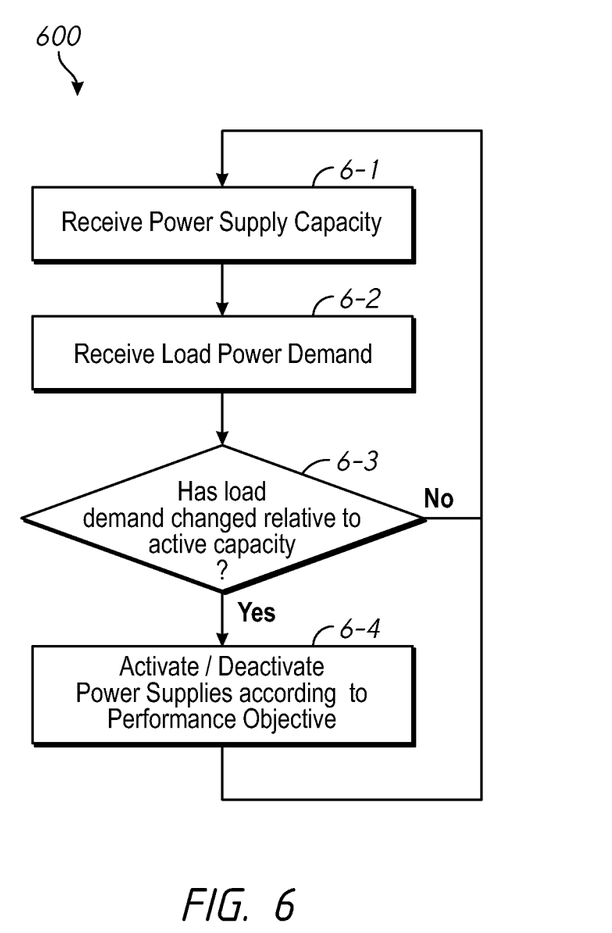
FIG. 6 is a flowchart representation of a method of managing power distribution carried out by a power control module in accordance with some implementations.

FIG. 6 is a flowchart representation of a method 600 of managing power distribution in accordance with some implementations. In some implementations, the method 600 is performed by a power control module associated with a power distribution system (e.g., power control module 120). Briefly, the method 600 includes receiving load power demand from a plurality of networking function modules that are each drawing power from a common power supply node; determining whether or not the load power demand relative to active power supply capacity has changed in breach of a threshold; and adjusting one or more power supplies in response to determining that the load power demand relative to the active power supply has changed in breach of the threshold, wherein adjusting is based at least in part on a performance objective.

To that end, as represented by block 6-1, the method 600 includes a power controller receiving power supply capacity information. For example, with reference to FIG. 1, the power control module 120 receives power supply capacity information from the power supplies 112-1, 112-2, 112-3, ..., 112-N. As represented by block 6-2, the method 600 includes the power controller receiving load demand information. For example, with reference to FIGS. 1, 4 and 5, the power control module 120 receives load demand information from at least one of the power supplies 112-1, 112-2, 112-3, ..., 112-N, the loads 114-1, 114-2, 114-3, ..., 114-M, and the sensor 438 coupled to the power supply node 118. In some implementations, load demand information is received on a substantially continuous basis. In some implementations, load demand information is received at periodically, with time between reports being sufficiently low to accurately track fluctuations in load demand.

As represented by block 6-3, the method includes the power controller determining if the load power demand has substantially changedp relative to active power supply capacity. If the load power demand has not substantially changed ("No" path from block 6-3), the method 600 circles back to the portion of the method represented by block 6-1. On the other hand, if the load power demand has substantially changed ("Yes" path from block 6-3), as represented by block 6-4, the method 600 includes responsively activating (i.e., switches to active mode from standby mode) or deactivating (i.e., switches to standby mode from active mode) one or more power supplies in accordance with one or more performance objectives, such as described above.

Figure 7:
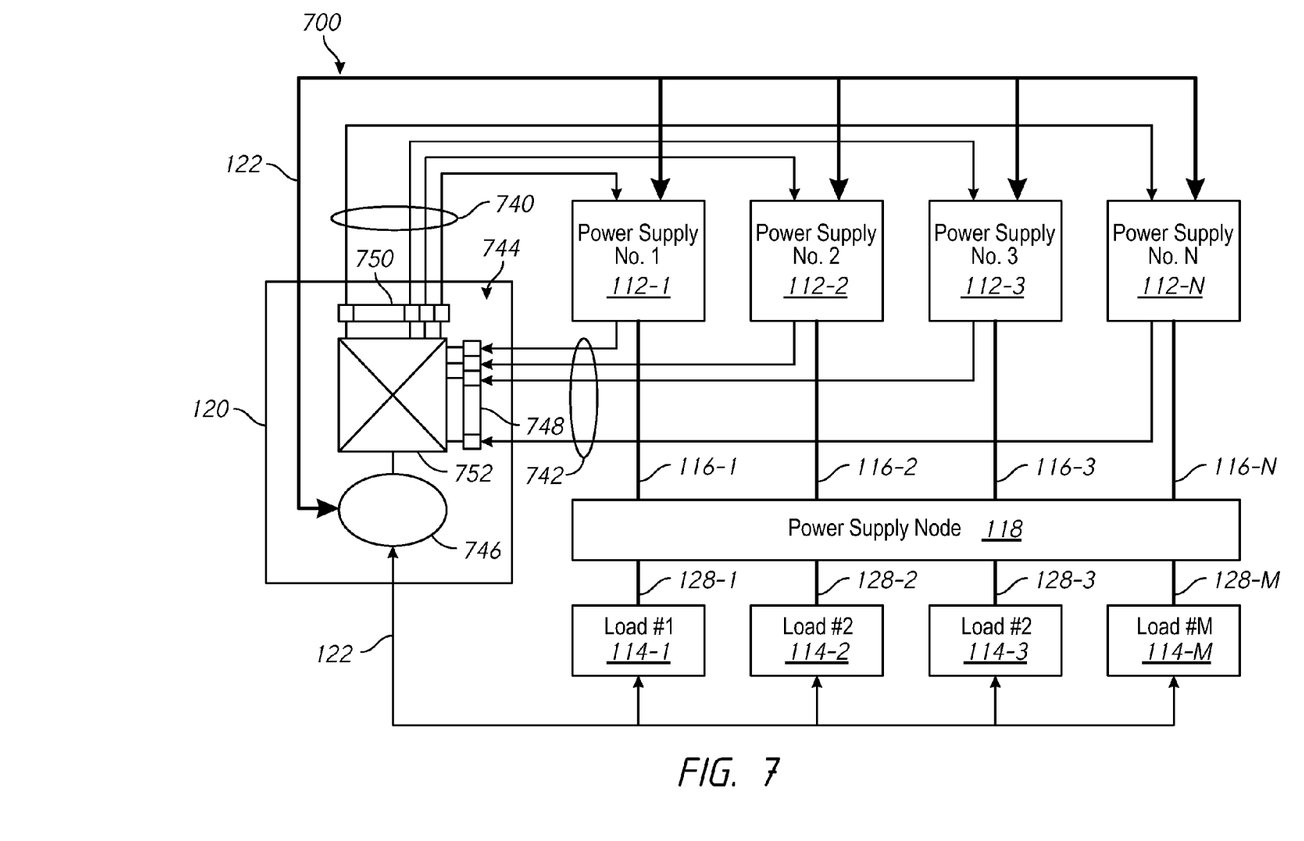
FIG. 7 is a block diagram of a power distribution system in accordance with some implementations.

FIG. 7 is a block diagram of a power distribution system 700 in accordance with some implementations. The power distribution system 700 shown in FIG. 7 is similar to and adapted from the power distribution system 100 shown in FIG. 1. Elements common to FIGS. 1 and 7 include common reference numbers, and only the differences between FIGS. 1 and 7 are described herein for the sake of brevity. To that end, the power distribution system 700 includes power control module 720 in place of the power control module 120 shown in FIG. 1.

With reference to FIG. 7, in accordance with some implementations, each of the power supplies 112-1, 112-2, 112-3, ..., 112-N is connected to the power control module 720 through a serial control bus 122. The power distribution system 700 includes respective enable/standby control lines 740 that are each coupled between a respective one of the power supplies 112-1, 112-2, 112-3, ..., 112-N and the power control module 720. Additionally, the power distribution system 700 includes respective power failure signal lines 742 that are each coupled between a respective one of the power supplies 112-1, 112-2, 112-3, ..., 112-N and the power control module 720. In some implementations, each load 114-1, 114-2, 114-3, ..., 114-M is also connected to the power control module 720 through the serial control bus 122.

In some implementations, the power control module 722 includes both a hardware component 744 and a software component 746. In some implementations, such as a software application executed by a central processing unit which primarily handles other data processing tasks. The hardware component 744 includes a number of input and output data registers 748, 750. The input registers 748 receive the power failure signals 742 transmitted by the power supplies 112-1, 112-2, 112-3, ..., 112-N. The output registers 750 provide the enable/standby control signals 740 that are transmitted to the power supplies 112-1, 112-2, 112-3, ..., 112-N. A switching matrix 752 processes the power failure signals 742 and sets the output registers 750 to activate one or more of the standby power supplies upon notice of power failure in one of the active power supplies. As this signaling and switching mechanism is implemented entirely in hardware, the reaction time to activate a standby power supply is very quick, e.g., less than a millisecond.

In some implementations, the software component 746 dynamically configures the switching matrix 752. The software component 746 receives information about load power consumption directly from the loads 114-1, 114-2, 114-3, . . . , 114-M over the serial control bus 122. The software component 746 also receives capacity and efficiency information from the power supplies 112-1, 112-2, 112-3, . . . , 112-N over the serial control bus 122. Thus, for example, as loads 114-1, 114-2, 114-3, . . . , 114-M are added or removed from the system 700, or as power supplies 112-1, 112-2, 112-3, . . . , 112-N are added or removed from the system 700, the software component 746 can dynamically reconfigure the switching matrix 752 in accordance with a performance objective to accommodate variations to the system 700 over time. Likewise, if the efficiency of any power supply changes, the software component 746 can vary the mix of active and standby power supplies by setting the output data registers 750.

Figure 8:
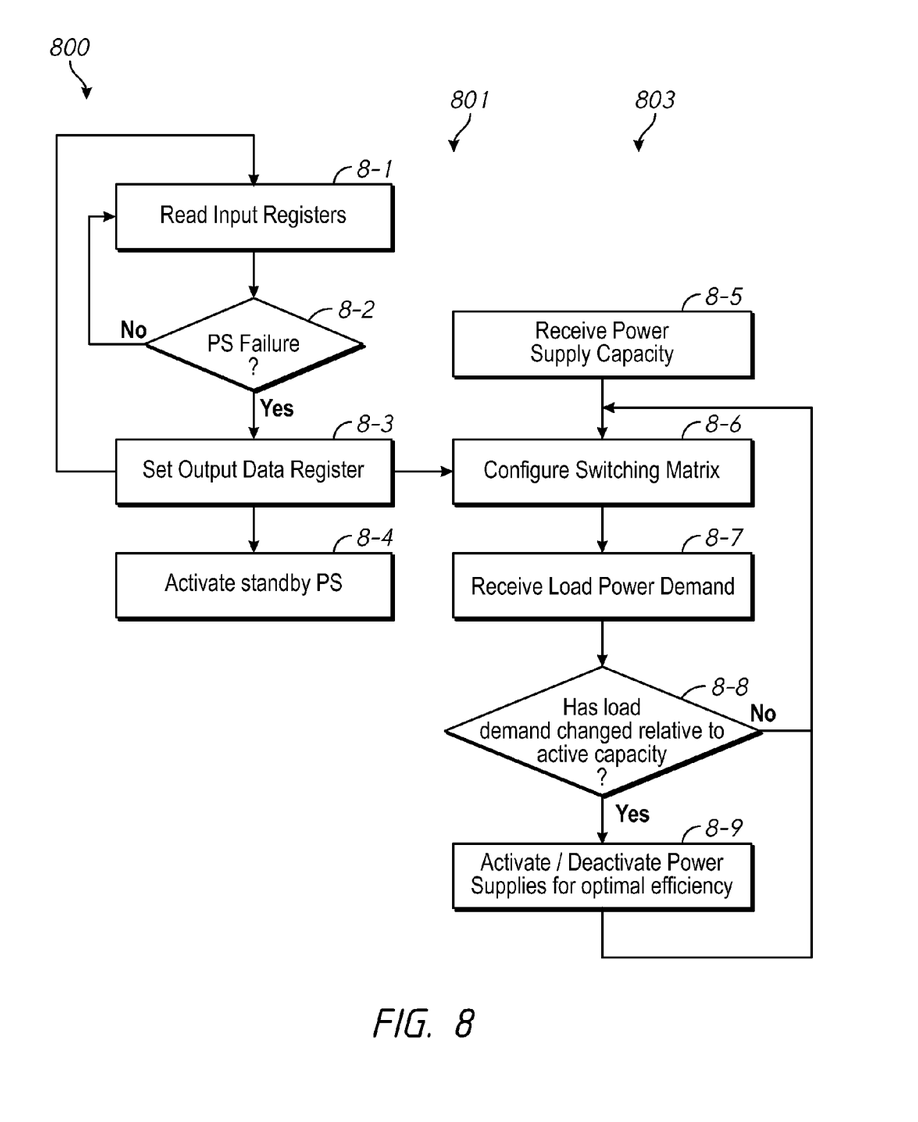
FIG. 8 is a flowchart representation of a method of managing power distribution performed by a power control module in accordance with some implementations.

FIG. 8 is a flowchart representation of a method 800 of managing power distribution performed by a power control module in accordance with some implementations. In some implementations, the method 800 is performed by an implementation of the power control module 720 associated with the power distribution system 700. Briefly, the method 800 includes receiving load power demand from a plurality of networking function modules that are each drawing power from a common power supply node; determining whether or not the load power demand relative to active power supply capacity has changed in breach of a threshold; and adjusting one or more power supplies in response to determining that the load power demand relative to the active power supply has changed in breach of the threshold, wherein adjusting is based at least in part on a performance objective.

In some implementations, the method 800 includes a hardware flow 801 performed by the hardware component 746, and a software flow 803 performed by the software component 746. With respect to the hardware flow 801, as represented by block 8-1, the method 800 includes the hardware component 744 reading and/or detecting a change in the input registers 748. As represented by block 8-2, the method 800 includes the hardware component 744 determining if one of the power supplies 112-1, 112-2, 112-3, . . . , 112-N has failed and/or experienced a significant drop in capacity. If a power supply failure and/or significant drop in capacity has not occurred ("No" path from block 8-2), the method 800 circles back to the portion of the method represented by block 8-1. If a power supply failure and/or significant drop in capacity has occurred ("Yes" path from block 8-2), then as represented by block 8-3, the method 800 includes the switching matrix 752 setting one or more of the output registers 750 in order to activate one or more the standby power supplies. Accordingly, as represented by block 8-4, the method 800 includes activating one or more the standby power supplies.

With respect to the software flow 803, as represented by block 8-5, the method 800 includes the software component 746 receiving/retrieving information providing the number of power supplies installed and the respective capacity of each. As represented by block 8-6, the method 800 includes the software component 746 configuring the switching matrix 52 based on the current mix of power supplies operating in active and standby modes as well as one or more performance objectives. In some implementations, the software component 746 can also be configured to recognize a power supply failure by reading the output registers 750 and determining if there are substantial changes in output supply or demand. In turn, in some implementations, the software component 746 re-configures the switching matrix 752 in responses to changes in system configuration caused by changes in output supply or demand. As represented by block 8-7, the method 800 includes the software component 746 receiving information on load power demand. As represented by block 8-8, the method 800 includes determining if the load power demand has substantially changed relative to active power supply capacity. If the load power demand has not substantially changed ("No" path from block 8-8), the method 800 circles back to the portion of the method represented by block 8-6. On the other hand, if the load power demand has substantially changed ("Yes" path from block 8-8), as represented by block 8-9, the method 800 includes responsively activating (i.e., switches to active mode from standby mode) or deactivating (i.e., switches to standby mode from active mode) one or more power supplies in accordance with one or more performance objectives, such as described above.

In some implementations, a device and/or a circuit having one or more features described herein can be included in a networking device such as a switch or router. Such a device and/or a circuit can be implemented directly in the networking device, in a modular form as described herein, or in some combination thereof.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A networking device comprising:
   a chassis that supports installation of network modules;
   a plurality of networking function modules, at least partially supported by the chassis, each provide a particular node function capacity;
   a common power supply node, at least partially supported by the chassis and coupled to the plurality of networking function modules, wherein each of the plurality of network function modules is arranged to receive power from the common power supply node;
   a plurality of power supplies, coupled to the common power supply node, each connectable to deliver current to the common power supply node, and each is configured to responsively adjust a corresponding output current in response to a control command; and
   a power control module, connected to the plurality of power supplies, and configured to adjust the operation of the plurality of power supplies by providing control commands to the plurality of power supplies, wherein the control commands are produced in response to changes in load power demand from the plurality of networking function modules relative to active power supply capacity provided by one or more of the plurality of power supplies and based at least in part on a performance objective function.

2. The device of claim 1, wherein the common power supply node serves as an aggregation point for current supplied by the plurality of power supplies.

3. The device of claim 1, wherein each of the plurality of power supplies is switchable between an active mode, in which a power supply is enabled to supply a substantial output current, and a standby mode, in which the power supply is substantially prevented from supplying an output current power but is ready to do so in response to receiving an enable command on the respective control input.

4. The device of claim 3, wherein at least some of the plurality of power supplies are configured to transmit a power failure signal to the power control module in response to sensing a failure condition, and wherein the load power demand increases in relation to the active power supply capacity.

5. The device of claim 3, wherein in response to substantial changes in the load power demand relative to the active power capacity, the power control module is configured to set each of the plurality of power supplies into the active mode or the standby mode in order to at increase overall system energy efficiency.

6. The device of claim 1, further comprising a plurality of electrical loads that are each connected to the power supply node in order to draw a respective current, wherein an aggregation of the respective current draws is indicative of the load power demand.

7. The device of claim 6, wherein one or more electrical loads are switchable into or out of the system so as to vary the load power demand relative to the active power supply capacity.

8. The device of claim 6, wherein the power control module is configured to receive load demand values from one or more electrical loads.

9. The device of claim 1, wherein the power control module is configured to detect a change in the load power demand from a transient change in at least one of output voltage and output current in the plurality of power supplies.

10. The device of claim 1, further comprising a sensor coupled to the power supply node and configured to detect at least one of the load power demand or a change in the load power demand.

11. The device of claim 1, wherein the power control module is configured to receive load demand values from one or more of the plurality of power supplies.

12. The device of claim 1, wherein at least one of the plurality of power supplies has a holdover time period where the at least one of the plurality of power supplies can adequately supply power to loads in event of a cessation of input power to the power supply, and wherein the power control module is configured to responsively activate another one of the plurality of power supplies or adjust the operation of one or more of the plurality of power supplies in a period of time at least equal to a shortest power supply holdover time.

13. The device of claim 1, wherein the power control module includes switching logic for activating and deactivating combinations of the plurality of power supplies in response to substantial changes in the load power demand and based at least in part on the performance objective function.

14. The device of claim 13, wherein the power control module is connected to each of the pluralities of power supplies via a dedicated control line for at least one of setting a corresponding power supply mode or a corresponding operating point based at least in part on the performance objective function.

15. The device of claim 14, wherein the power control module includes a software application for configuring switching logic.

16. A method comprising:
   at a networking device including a plurality of networking function modules, a common power supply node, a plurality of power supplies, and a power control module:
   receiving load power demand from the plurality of networking function modules that are each provide a particular node function capacity and are each arranged to receive power from the common power supply node; and
   adjusting the operation of the plurality of power supplies that are each connectable to deliver current to the common power supply node and are each configured to responsively adjust a corresponding output current in response to a control command, wherein adjusting the operation includes providing control commands that are produced in response to changes in the load power demand relative to active power supply capacity provided by one or more of the plurality of power supplies and based at least in part on a performance objective.

17. The method of claim 16, wherein receiving the load power demand includes at least one of receiving load demand values from one or more power supplies, sensing a change in an electrical level at the common power supply node, or receiving load demand requests from one or more of the plurality of networking function modules.

18. The method of claim 16, wherein adjusting the operation includes at least one of switching a power supply between an active mode and a standby mode or adjusting a load factor of a power supply.

\* \* \* \* \*